(No Model.)

E. VILLIERS.
Die for Molding Thimbles from Celluloid or other Material.

No. 233,898.  Patented Nov. 2, 1880.

Attest:
Joseph M. A. End
Sam'l C. Hawkins

Inventor.
Eugène Villiers
By Horace Harris
atty

UNITED STATES PATENT OFFICE.

EUGÈNE VILLIERS, OF NEWARK, N. J., ASSIGNOR TO HIMSELF AND LIGNOID FANCY ARTICLE MANUFACTURING COMPANY, OF SAME PLACE.

DIES FOR MOLDING THIMBLES FROM CELLULOID OR OTHER MATERIAL.

SPECIFICATION forming part of Letters Patent No. 233,898, dated November 2, 1880.

Application filed September 6, 1880. (No model.)

*To all whom it may concern:*

Be it known that I, EUGÈNE VILLIERS, of Newark, in the county of Essex and State of New Jersey, have invented a new and useful Improvement in Dies for Molding Thimbles from Celluloid or other Material, of which the following is a specification.

My invention relates to dies for molding thimbles or like articles of lignoid, celluloid, or other like plastic material; and it consists in the improvement in the order and construction of the dies for the better removal of the thimbles after they have been molded.

Heretofore the dies have been made with but two plates, meeting at a line with the top of the thimbles, and the thimbles pressed into the lower dies have been removed with much difficulty and delay. To remedy this difficulty is the object of my invention, which I do by means of a three-plate die.

Figure 1:
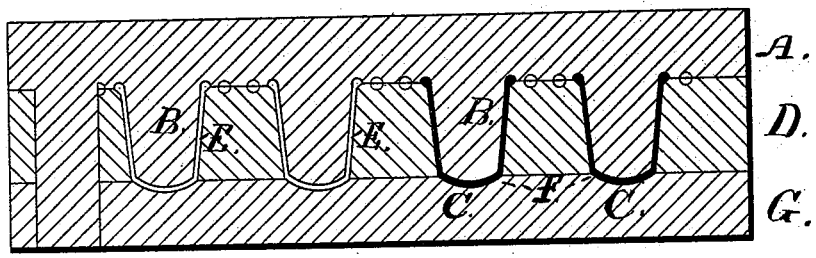
Figure 1:
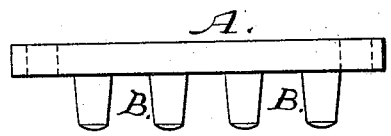
Figure 2:
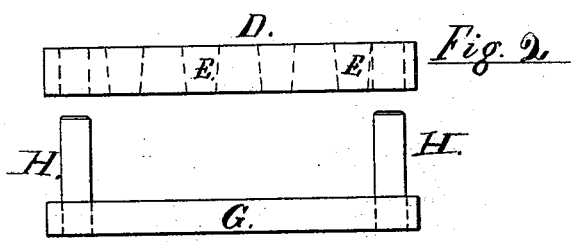
Figure 3:
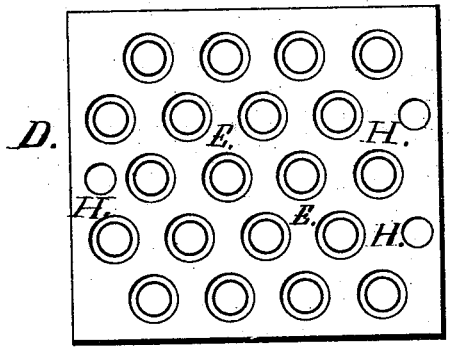

Figure 1 is a cross-section, showing the three plates as in use. Fig. 2 is a side view of the dies separated. Fig. 3 is a detailed plan of the middle plate.

In my construction A is the upper die, having the conical forms B to press out the inside of the thimbles C. D is a counter-die, having the recesses E, in which the thimbles are molded down to the rounded top F. G is the lower die, made to meet the die D at the point of the junction of the top and sides of the thimble.

In use the die D is laid on the die G, guided by the pins H, which pins are made to extend also as guides through the plate A.

The plastic material, in sheets, is laid on the die D, and the die A, with its forms B, is brought down and the thimbles are molded. Then the upper die is removed and the die D also lifted, carrying the thimbles, and is inverted, when a slight tap on the end F of the thimbles removes them from the die, and the plates are ready again for use. In this way, by parting the molds as set forth, I readily remove the thimbles and at a great saving of time and expense in the manufacture of these goods.

What I claim as my invention, and desire to secure by Letters Patent, is—

The dies for molding thimbles or like articles, having three plates, A, D, and G, with the joint between the plates D on a line with the junction of the sides and top of the thimbles, providing that when the dies are separated, after the thimbles have been molded, the thimbles by being slightly hit on the top will be readily removed from the die D, substantially as specified.

EUGÈNE VILLIERS.

Witnesses:
 HORACE HARRIS,
 SAML. C. HAWKINS.